United States Patent
Peters et al.

(10) Patent No.: US 9,811,931 B2
(45) Date of Patent: Nov. 7, 2017

(54) RECOMMENDATIONS FOR CREATION OF VISUALIZATIONS

(71) Applicants: Geoff Peters, Vancouver (CA); Sheng Li, Vancouver (CA); Teresa Su, Vancouver (CA); Anne Tan, Vancouver (CA); Amrit Birring, Surrey (CA)

(72) Inventors: Geoff Peters, Vancouver (CA); Sheng Li, Vancouver (CA); Teresa Su, Vancouver (CA); Anne Tan, Vancouver (CA); Amrit Birring, Surrey (CA)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 829 days.

(21) Appl. No.: 14/293,314

(22) Filed: Jun. 2, 2014

(65) Prior Publication Data

US 2015/0346956 A1     Dec. 3, 2015

(51) Int. Cl.
| | |
|---|---|
| G06F 3/0484 | (2013.01) |
| G06T 11/60 | (2006.01) |
| G06F 3/0482 | (2013.01) |
| G06Q 10/00 | (2012.01) |
| G06F 17/21 | (2006.01) |

(52) U.S. Cl.
CPC ............ *G06T 11/60* (2013.01); *G06F 3/0482* (2013.01); *G06Q 10/00* (2013.01); *G06F 17/211* (2013.01)

(58) Field of Classification Search
CPC . G06T 11/206; H04L 12/2458; G01R 13/345; G01R 13/20; G01R 13/0227; G01R 13/22; G09G 5/222; G09G 1/162; G06F 3/04845; G06F 3/0481; G06F 17/246; G06Q 40/04; G06Q 10/10; G06Q 30/06
See application file for complete search history.

(56) References Cited

U.S. PATENT DOCUMENTS

| | | | |
|---|---|---|---|
| 7,493,330 B2 | 2/2009 | Cubranic | |
| 8,219,560 B2 | 7/2012 | Abhyankar et al. | |
| 8,296,666 B2 * | 10/2012 | Wright | G06F 17/30017 715/764 |
| 2002/0109704 A1 * | 8/2002 | Rajarajan | G06F 9/4443 345/619 |
| 2004/0068697 A1 | 4/2004 | Harik et al. | |

(Continued)

*Primary Examiner* — Todd Buttram
(74) *Attorney, Agent, or Firm* — Buckley, Maschoff & Talwalkar LLC

(57) ABSTRACT

A system includes reception of a selection of a first object from a plurality of measure objects and dimension objects, determination, for each of a plurality of unselected objects of the plurality of measure objects and dimension objects, of a first number of visualizations which are associated with the first object and with the unselected object, determination of a second number of visualizations which are associated with the first object, determination, for each of the plurality of unselected objects, of a third number of visualizations which are associated with the unselected object, determination of a total number of visualizations, and determination, for each of the plurality of unselected objects, of a value associated with the unselected object based on the first number associated with the unselected object, the second number, the third number associated with the unselected object and the total number.

20 Claims, 15 Drawing Sheets

(56) References Cited

U.S. PATENT DOCUMENTS

| | | |
|---|---|---|
| 2006/0224552 A1 | 10/2006 | Riezler et al. |
| 2007/0112744 A1 | 5/2007 | Arrouye et al. |
| 2007/0276636 A1* | 11/2007 | Wythoff ................ G06F 19/708 703/2 |
| 2008/0082578 A1 | 4/2008 | Hogue et al. |
| 2008/0109285 A1 | 5/2008 | Reuther et al. |
| 2008/0294663 A1 | 11/2008 | Heinley et al. |
| 2008/0295016 A1 | 11/2008 | Audet |
| 2009/0238414 A1 | 9/2009 | Boerries et al. |
| 2010/0094823 A1 | 4/2010 | Lemaire |
| 2011/0164055 A1* | 7/2011 | McCullough ....... G06F 3/04845 345/642 |
| 2013/0073619 A1* | 3/2013 | Tumuluri ................ G06T 19/20 709/204 |

\* cited by examiner

RECOMMENDATIONS FOR CREATION OF VISUALIZATIONS

BACKGROUND

Conventional database systems store large volumes of data. The data typically conforms to a logical schema which characterizes the data and exposes relationships within the data. Analytics applications leverage this logical schema to provide visualizations, such as charts and graphs, which present selected data in an intuitive format.

More specifically, conventional systems map logical entities of a database's schema to a set of abstract entities known as business objects. The business objects may represent business entities, such as customers, time periods, financial figures (e.g., sales, profit) etc. Business objects may be classified as dimensions (along which one may want to perform an analysis), and measures (e.g., indicators, most often numeric, whose value can be determined for a given combination of dimension values).

A user selects business objects in order to create a visualization presenting data associated with the business objects. For example, a user may select a Country dimension and a Sales measure. A visualization is then generated which shows total sales for each country represented in the database. In many instances, however, it can be difficult for a user to determine suitable measures and/or dimensions to select for inclusion in a visualization.

DETAILED DESCRIPTION

The following description is provided to enable any person in the art to make and use the described embodiments and sets forth the best mode contemplated for carrying out some embodiments. Various modifications, however, will remain readily apparent to those in the art.

Generally, some embodiments provide information to assist a user in selecting appropriate dimensions and measures to include in a data visualization.

Figure 1:
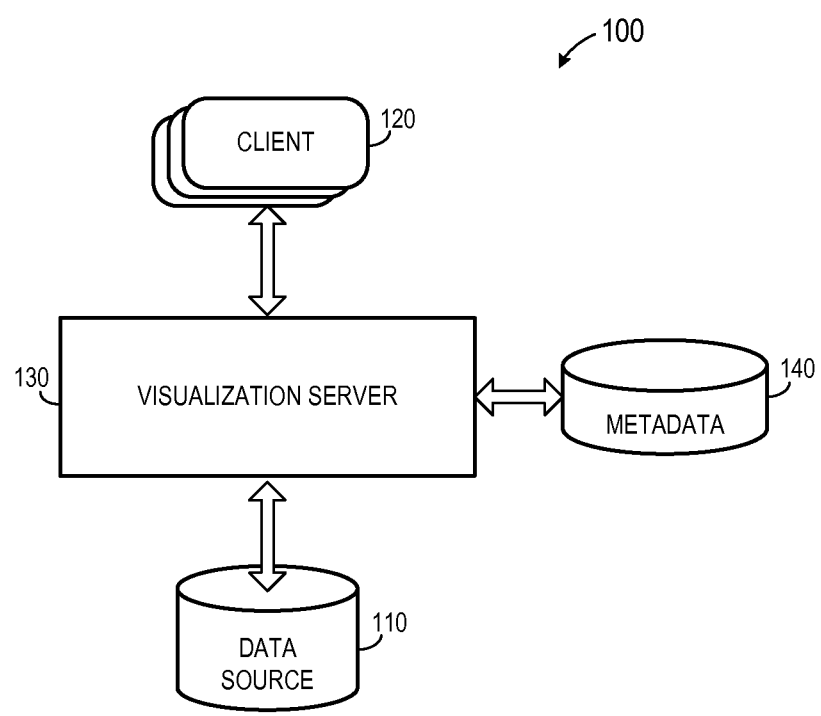
FIG. 1 is a block diagram of a system according to some embodiments.

FIG. 1 is a block diagram of system 100 according to some embodiments. System 100 includes data source 110, clients 120, visualization server 130 and metadata 140. Generally, visualization server 130 receives queries from clients 120 and provides visualizations to clients 120 based on metadata 140 and data of data source 110. Data source 110, visualization server 130 and metadata 140 may support multi-tenancy to separately support multiple unrelated clients by providing multiple logical database systems which are programmatically isolated from one another.

Data source 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, the full database may be stored in one or more fixed disks (e.g., persistent memory for storing their respective portions of the full database) and accessed during operation when needed.

Data source 110 may comprise any query-responsive data source or sources that are or become known, including but not limited to a structured-query language (SQL) relational database management system. Data source 110 may comprise a relational database, a multi-dimensional database, an eXtendable Markup Language (XML) document, or any other data storage system storing structured and/or unstructured data. Data source 110 may be distributed among several relational databases, dimensional databases, and/or other data sources. Embodiments are not limited to any number or types of data sources.

In some embodiments, data of data source 110 may comprise one or more of conventional tabular data, row-based data, column-based data, and object-based data. Moreover, the data of data source 110 may be indexed and/or selectively replicated in an index to allow fast searching and retrieval thereof Visualization server 130 generally provides data of data source 110 to analysis clients, such as clients 120, in response to queries received therefrom. In some embodiments, visualization server 130 receives an instruction from a client 120 including a visualization type (e.g., bar chart, pie chart), one or more business objects, and mappings between the business objects and elements of the visualization (e.g., Sales=Y-Axis, Year=X-Axis). Visualization server 130 generates a statement execution plan based on the instruction and the plan is forwarded to data source 110, which executes the plan and returns a dataset based on the plan. Visualization server 130 then creates a visualization based on the dataset and returns the visualization to the client 120. Embodiments are not limited thereto.

Visualization server 130 may be separated from or closely integrated with data source 110. Visualization server 130 may also or alternatively be integrated with an application server for executing database applications and providing associated functionality to clients 120.

Each of clients 120 may comprise one or more devices executing program code of a software application for presenting user interfaces to allow interaction with visualization server 130, and to present resulting visualizations. Presentation of a user interface may comprise any degree or type of rendering, depending on the type of user interface code generated by visualization server 130. For example, a client 120 may execute a Web Browser to request and receive a Web page (e.g., in HTML format) from visualization server 130 via HTTP, HTTPS, and/or WebSockets, and may render and present the Web page according to known protocols. One or more of clients 120 may also or alternatively present user interfaces by executing a standalone executable file (e.g., an .exe file) or code (e.g., a JAVA applet) within a virtual machine.

Metadata 140 includes metadata which defines business objects and maps the business objects as described above to specific physical entities of data source 110. This metadata therefore defines an abstraction layer residing between clients 120 and data source 110.

Metadata 140 also includes metadata defining visualizations. This metadata may specify a respective set of measures and/or dimensions associated with each of several visualizations. This metadata may relate to user-created visualization and/or visualizations shipped with a product embodying server 130 and metadata 140. In the case of a user-created visualization, the metadata may also indicate the user who created the visualization, as well as usage of the visualization by other users. As will be described in more detail below, metadata 140 may represented the creation and usage data in a graph data structure.

Figure 2:
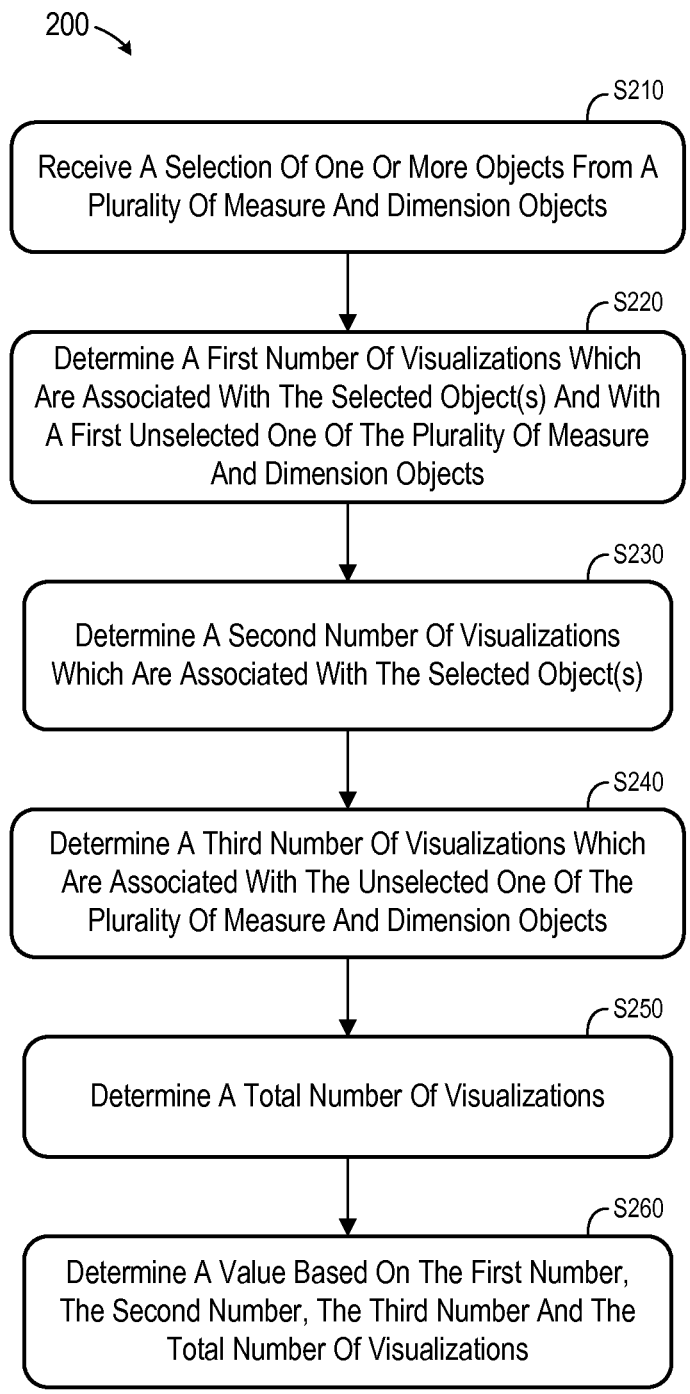
FIG. 2 is a flow diagram of a process according to some embodiments.

FIG. 2 is a flow diagram of process 200 according to some embodiments. Process 200 may be executed by visualization server 130 according to some embodiments. All processes mentioned herein may be executed by various hardware elements and/or embodied in processor-executable program code read from one or more of non-transitory computer-readable media, such as a hard drive, a floppy disk, a CD-ROM, a DVD-ROM, a Flash drive, Flash memory, a magnetic tape, and solid state Random Access Memory (RAM) or Read Only Memory (ROM) storage units, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210, a selection of one or more objects is received. The one or more objects are selected from a set of measure objects and dimension objects. The selection may be received via any usage scenario. According to some embodiments, a user initiates creation of a visualization by operating a client 120 to connect to data source 110 through visualization server 130, and to request a list of objects associated with data source 110. As mentioned above, metadata 140 stores objects of an abstraction layer corresponding to the logical schema of data source 110. Accordingly, visualization server 130 retrieves the objects of the abstraction layer from metadata 140 and provides a user interface to client 120 which lists the objects.

Figure 3:
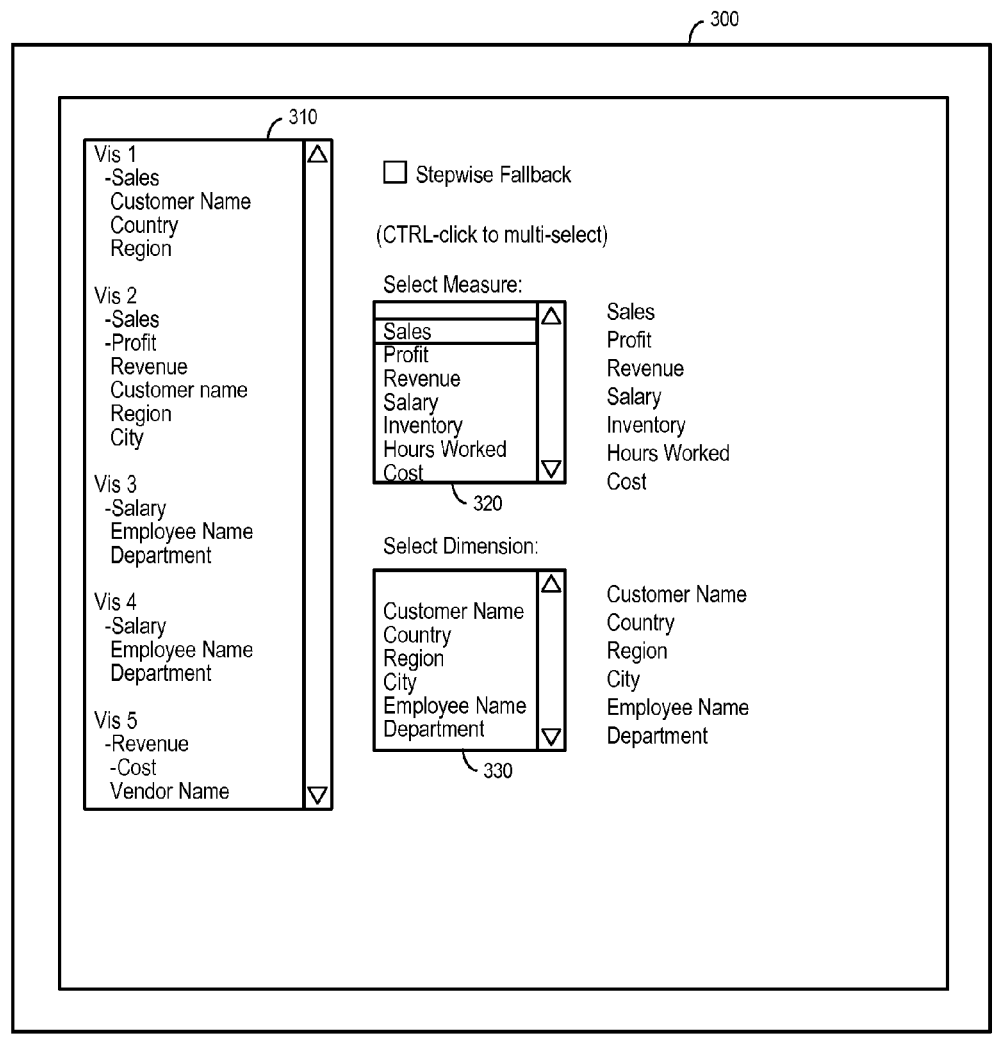
FIG. 3 is an outward view of a graphical interface according to some embodiments.

FIG. 3 is an outward view of interface 300 according to some embodiments. Interface 300 may be displayed on a client 120 and may receive a selection of one or more objects, which is in turn received by visualization server 130 at S210. Embodiments are not limited to the appearance, structure or content of interface 300 or any of the interfaces described herein.

Interface 300 includes list 310 of visualizations, list 320 of measure objects and list 330 of dimension objects. List 310 includes visualizations described in metadata 140, and a list of objects associated with each listed visualization in metadata 140. In this example, measure objects are denoted by "–". List 320 includes measure objects of the abstraction layer of data source 110 as specified in metadata 140, and list 330 includes dimension objects which are similarly specified in metadata 140.

FIG. 3 illustrates selection of the Sales measure object. According to the present example, visualization server 130 receives this selection at S210. Next, at S220, a first number of visualizations is determined The number reflects the number of visualizations in the system which are associated with the selected object and with an unselected one of the plurality of measure and dimension objects. In this regard, process 200 determines a value which reflects a "relatedness" between a single unselected object and all currently-selected objects.

It will be assumed that the unselected object of interest is the Customer Name dimension object. Therefore, at S220, all visualizations of list 310 which include the Sales measure object and the Customer Name dimension object are identified and their number is totaled. According to the present example, it will be assumed that nine visualizations of list 310 include the Sales measure object and the Customer Name dimension object.

A second number of visualizations is determined at S230. The second number indicates the number of visualizations which are associated with the selected one or more objects, regardless of whether the visualizations are associated with the unselected object of interest. In the present example, the second number is assumed to be twelve.

Next, at S240, a third number is determined, representing the number of visualizations in the system which are associated with the unselected object (i.e., Customer Name). Whether or not these visualizations are also associated with one or more of the selected objects is irrelevant to the determination at S240. The third number is assumed to be fifteen in the present example.

The total number of visualizations in the system is determined at S250. We will assume a total number of twenty-five.

A value is determined at S260 based on the first number, the second number, the third number and the total number. The value may assist the user in determining whether or not to select the unselected object for addition to the current visualization. The value may reflect a "relatedness" of the unselected object to the one or more currently-selected objects, with respect to their usage together within visualizations.

According to some embodiments, the value is determined at S260 using the following formula:

$$\text{Value} = (N1/\text{TOTAL} - ((N2/\text{TOTAL})*(N3/\text{TOTAL})))*1000,$$

where N1 is the first number, N2 is the second number, N3 is the third number, and TOTAL is the total number. Using the numbers of the above example, Value=(9/25−((12/25)*(15/25)))*1000=72

In another example, N1=4, N2=5, N3=20 and TOTAL=25. Consequently, Value=(4/25−((5/25)*(20/25)))*1000=0. The larger value in the first example reflects a higher degree of "relatedness" than in the second example.

According to some embodiments, S260 may comprise any one or more calculations that is or becomes known. In some embodiments, the calculation comprises:

$$\text{Value} = (N1/\text{TOTAL})/((N2/\text{TOTAL})*(N3/\text{TOTAL}))$$

According to the above calculation, values greater than one indicate a higher degree of relatedness than values less than one.

Figure 4:
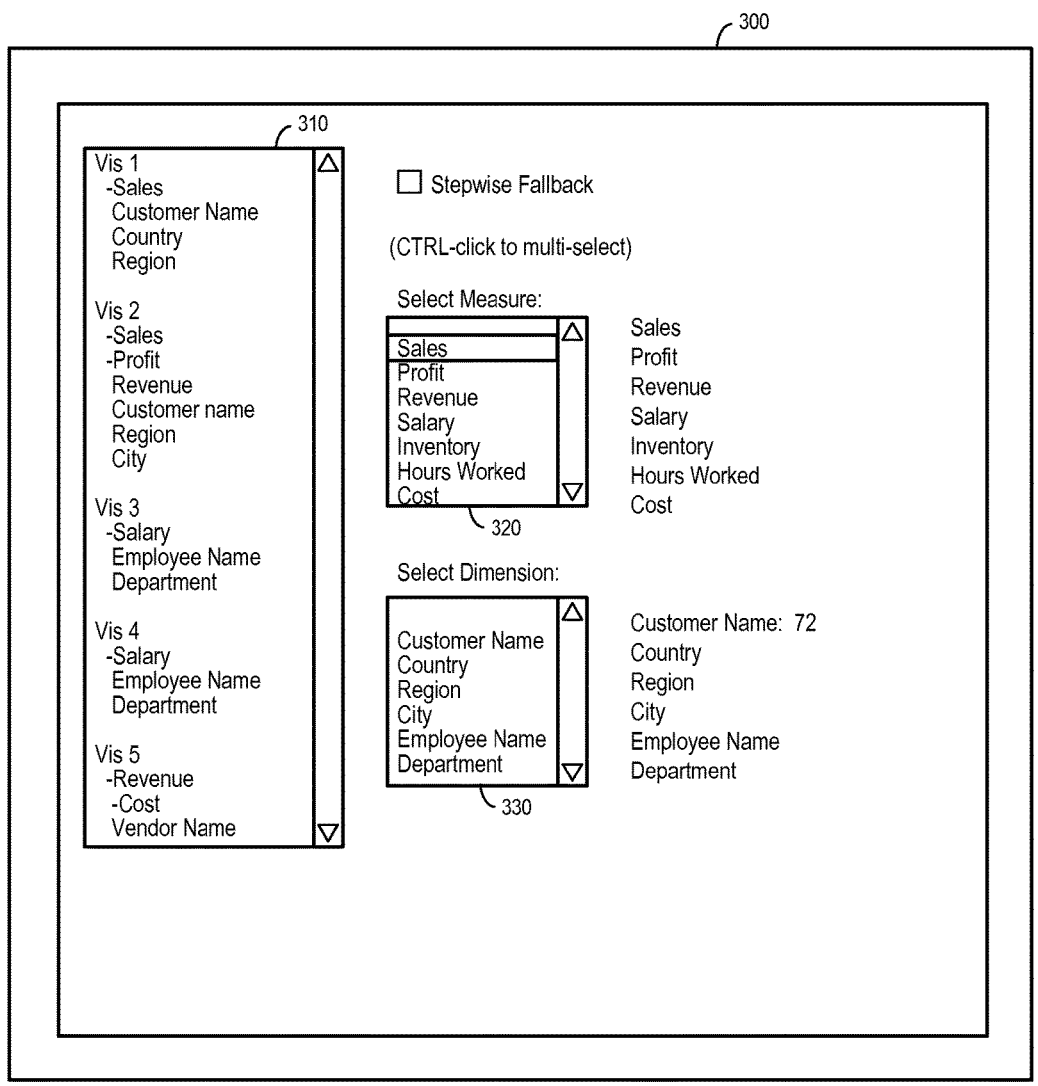
FIG. 4 is an outward view of a graphical interface according to some embodiments.

FIG. 4 illustrates interface 300 after determination of a value at S260 associated with the Customer Name object.

The value (i.e., 72) is displayed in conjunction with the Customer Name object. According to some embodiments, process 200 is repeated for each other unselected object in order to determine a value for each unselected object.

Figure 5:
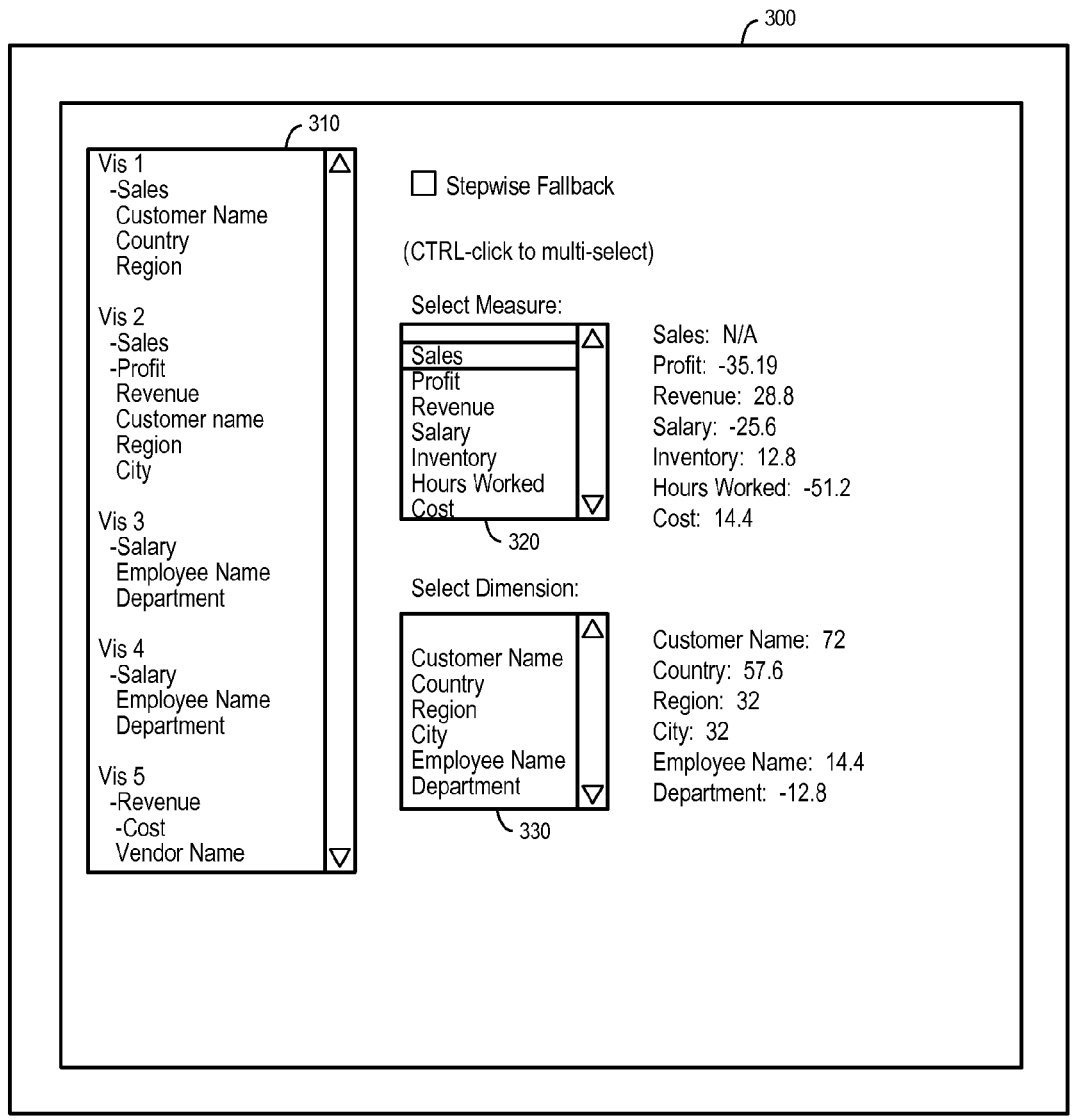
FIG. 5 is an outward view of a graphical interface according to some embodiments.

FIG. 5 illustrates interface 300 after determination of a value for each unselected object (i.e., for each measure object and dimension object other than the selected Sales object). As shown, in view of the particular example calculation provided above, the value may be negative. A negative value with a larger absolute value, according to this example indicates less relatedness than a negative value with a smaller absolute value.

Figure 6:
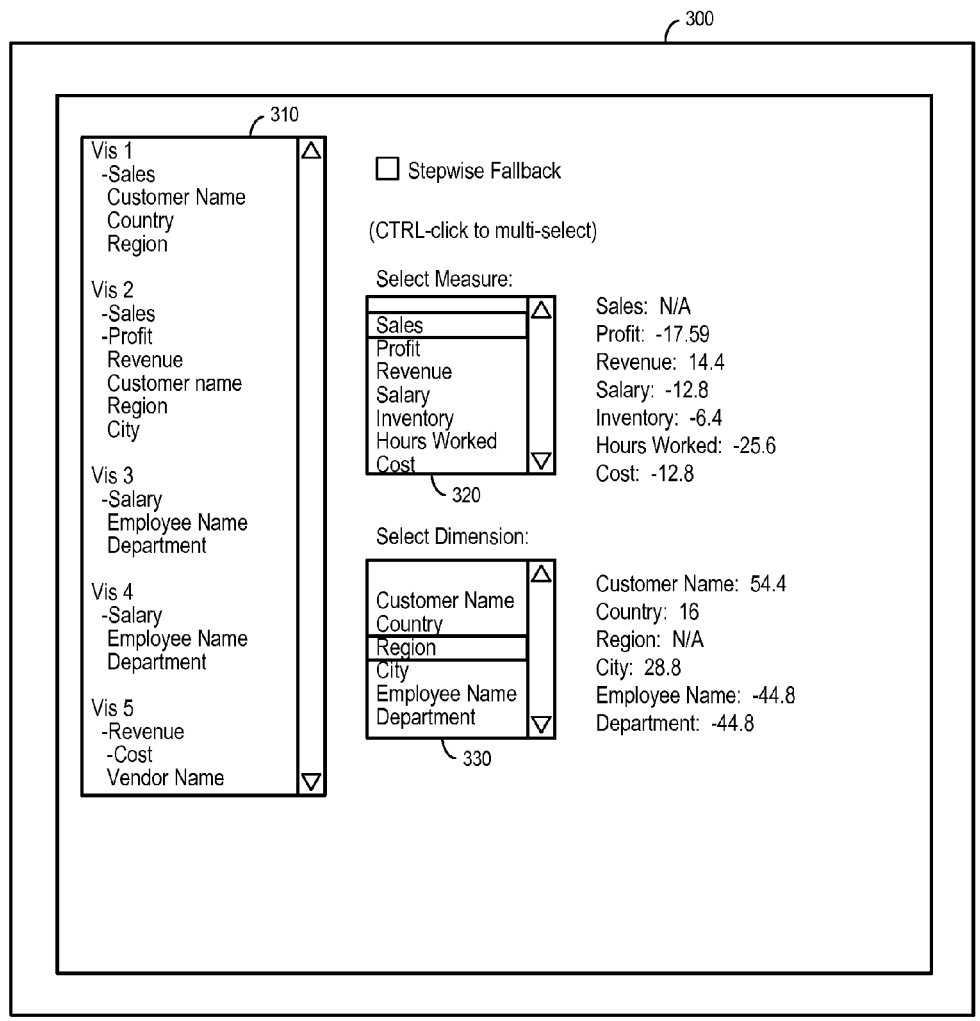
FIG. 6 is an outward view of a graphical interface according to some embodiments.

FIG. 6 is a view of interface 300 in a case that the selection received at S210 includes more than one object. In particular, the Sales measure object and the Region dimension object have been selected. A first number, second number, third number and total number are determined for a particular unselected object at S220 through S250 as described above. The first number is a number of visualizations which are associated with the unselected object, the Sales measure object and the Region dimension object. The second number is a number of visualizations which are associated with the Sales measure object and the Region dimension object, and the third number is a number of visualizations which are associated with the unselected object.

Again, process 200 may be executed for each unselected object, resulting in a value corresponding to each unselected object. These values according to one example are shown in FIG. 6.

Figure 7:
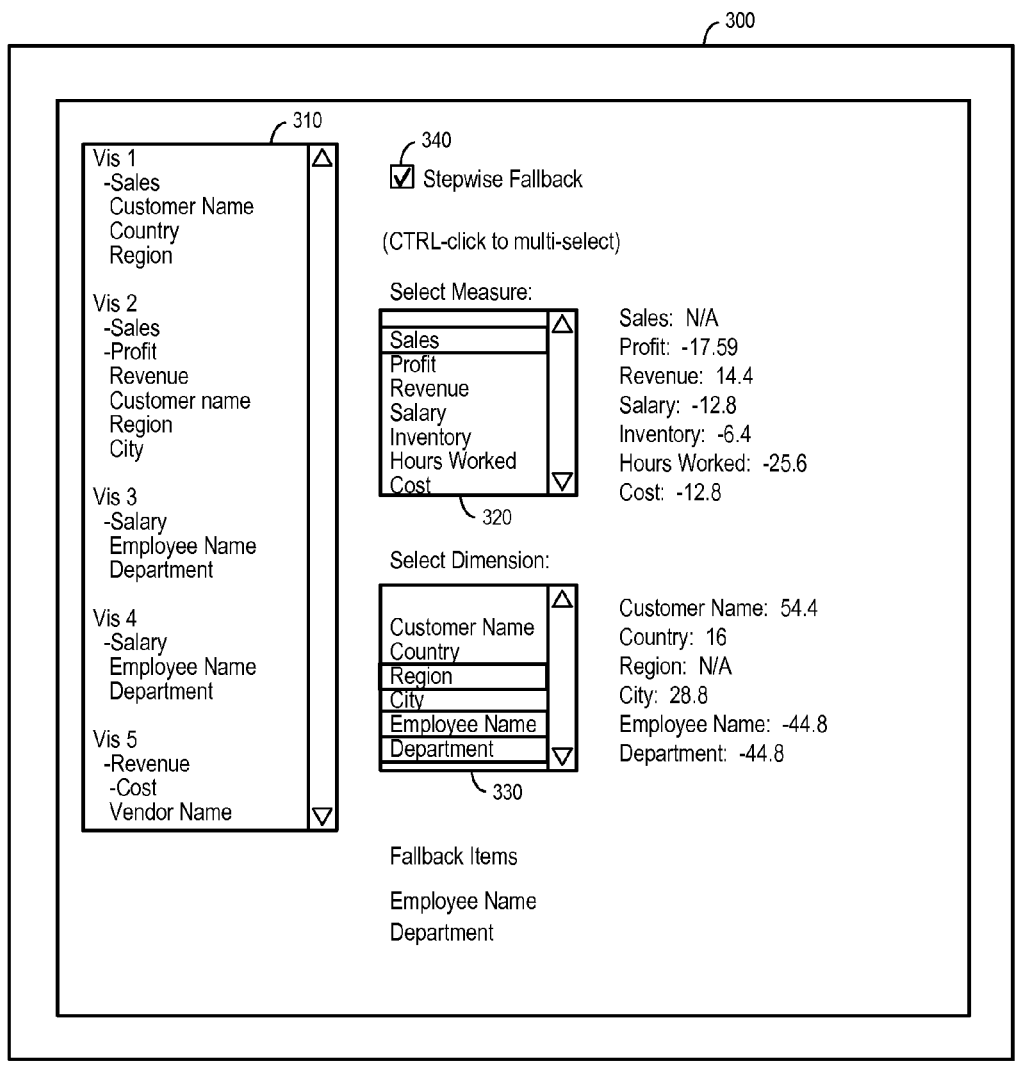
FIG. 7 is an outward view of a graphical interface according to some embodiments.

FIG. 7 is a view of interface 300 showing in which the Sales measure object, the Region dimension object, the Employee Name dimension object and the Department dimension object have been selected. It will be assumed that no visualizations are associated with all four selected objects. Accordingly, the first number determined at S220 is zero.

According to some embodiments, such a scenario reverts to "stepwise fallback" mode, as indicated by checkbox 340. In this mode, one of the selected objects is removed from the determination at S220 until the first number is determined to be greater than zero. Removal of the objects may be based on priority, in that objects are removed in order of lowest priority. Priority of an object may be based on the number of visualizations which are associated with that object (i.e., the greater the number of visualizations, the greater the priority).

Interface 300 of FIG. 7 illustrates removal of both the Employee Name dimension object and the Department dimension object at S220. Therefore, the first number, second number, third number and total number are determined for a particular unselected object are determined based on the Sales measure object and the Region dimension object. As a result, the values depicted in FIG. 7 are the same as those shown in FIG. 6, in which only the Sales measure object and the Region dimension object were selected.

Figure 8:
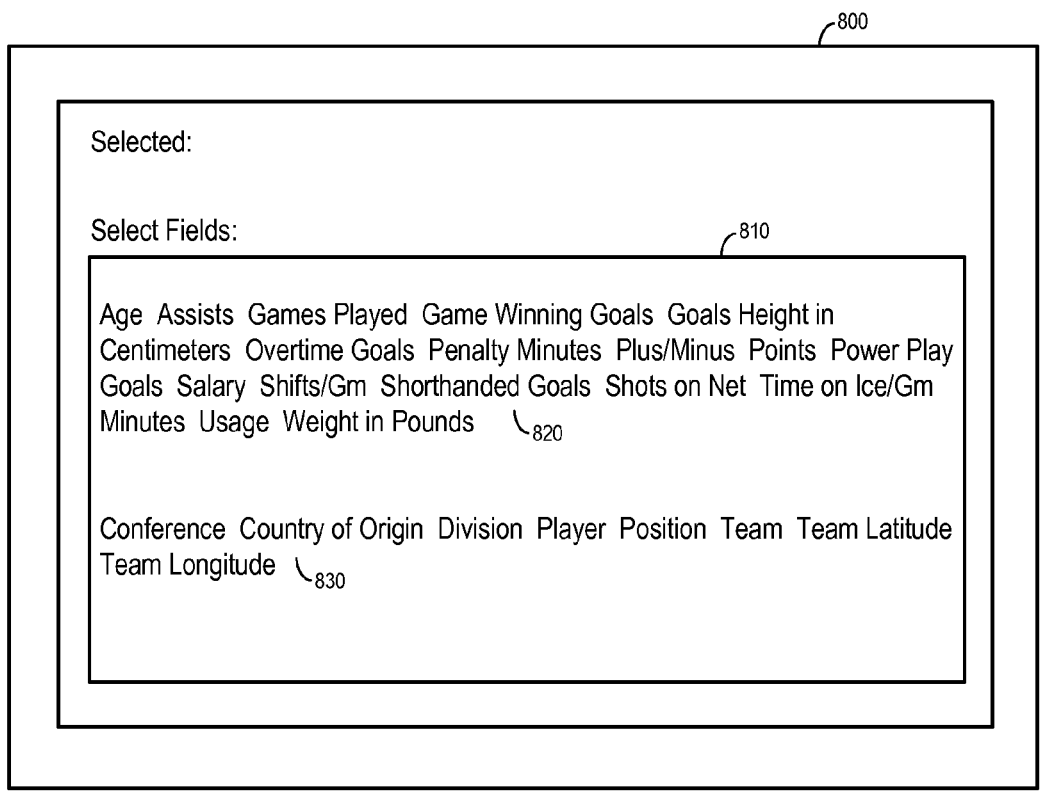
FIG. 8 is an outward view of a graphical interface according to some embodiments.

FIG. 8 is an outward view of interface 800 according to some embodiments. Interface 800 may be displayed on a client 120 as a component of a wizard for creating visualizations. Interface 800 includes selection area 810 listing measure objects 820 and dimension objects 830. Measure objects 820 and dimension objects 830 are listed separately and in alphabetical order, but embodiments are not limited to either approach. Measure objects 820 and dimension objects 830 may comprise objects of an abstraction layer of data source 110 as specified in metadata 140.

Figure 9:
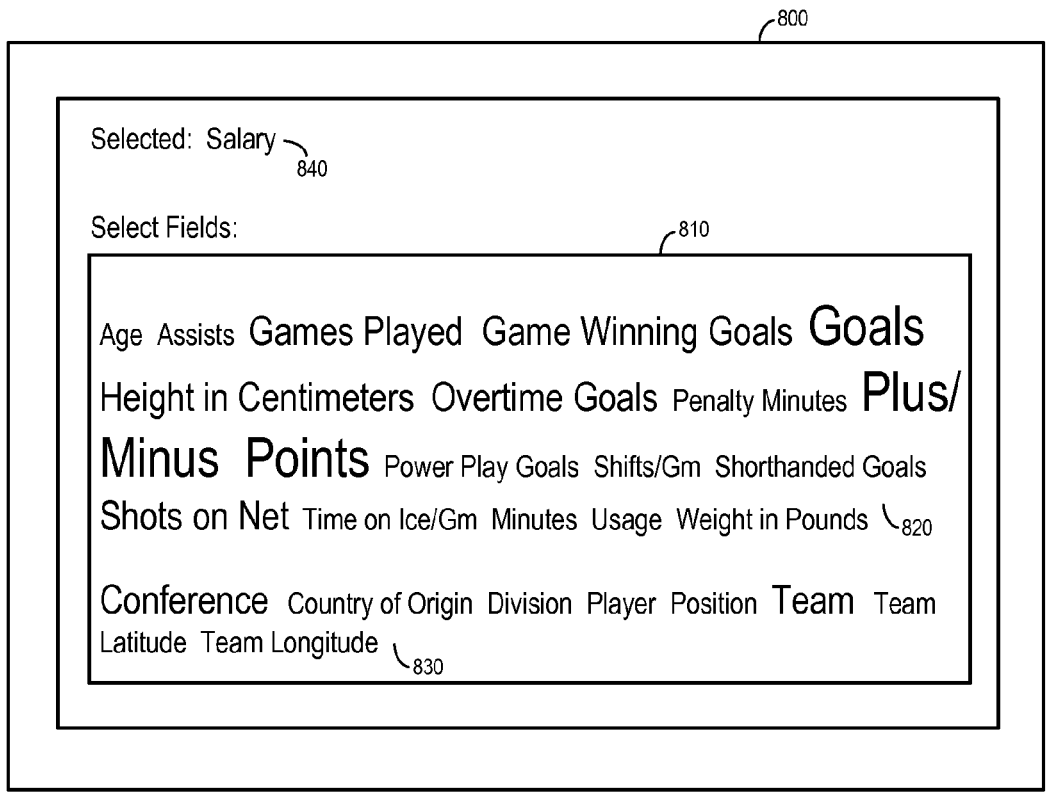
FIG. 9 is an outward view of a graphical interface according to some embodiments.

FIG. 9 illustrates interface 800 after selection of the Salary measure object. This selection may be received at S210 of process 200. As shown, the selection causes the Salary measure object to be removed from objects 820 and to be placed in Selected field 840.

Reception of the selection at S210 also causes execution of S220 through S260 as described above for each other object shown in selection area 810, with respect to the selected Salary object. This execution results in determination of a value corresponding to each of the objects of selection area 810. According to the embodiment of FIG. 9, the displayed font size of an object is controlled based on the determined value corresponding to the object.

For example, the value determined for the Goals measure object is greater than the value determined for the Games Played measure object, indicating that the Goals measure object is more "related" to the Salary object in terms of common usage in a visualization. Similarly, the value determined for the Games Played measure object is greater than the value determined for the Minutes measure object. The embodiment of FIG. 9 may therefore provide visually-intuitive recommendations of objects to add to a visualization.

According to some embodiments, each font size in area 810 corresponds to a range of values. That is, values within a first range correspond to a first font size, values within a second range correspond to a second font size, etc. Any one or more visual indicators (e.g., size, color, transparency, etc.) may be used which allow a user to distinguish the relative size of values determined for each object.

Figure 10:
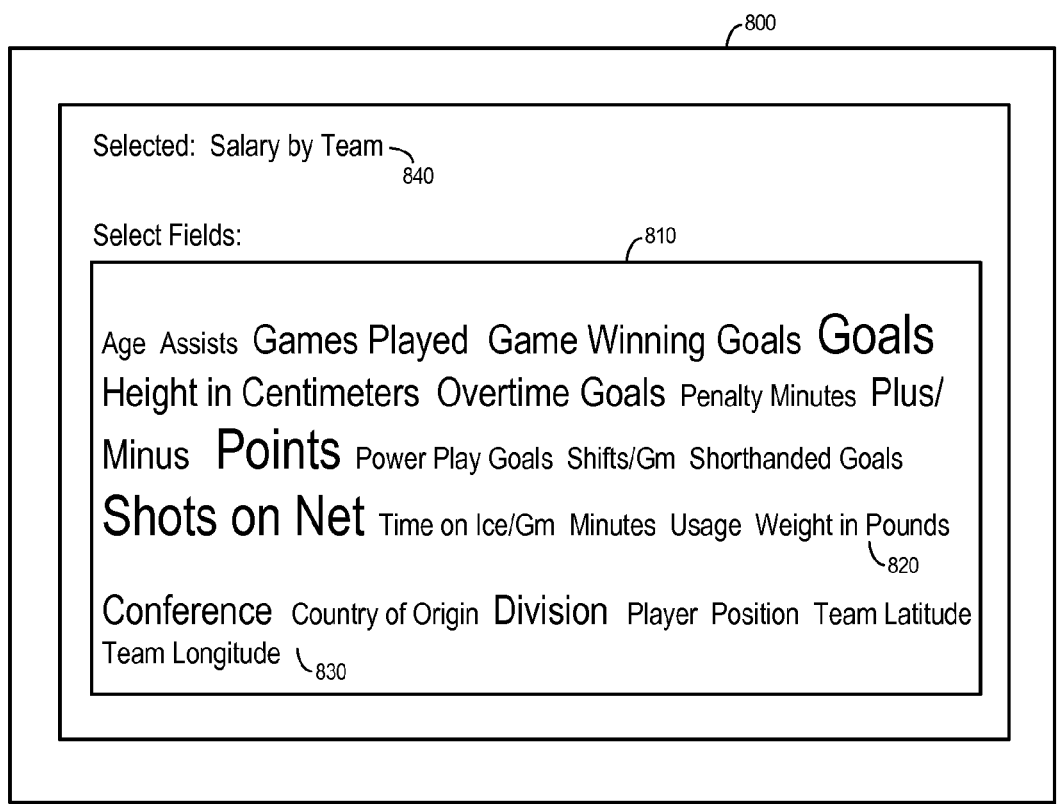
FIG. 10 is an outward view of a graphical interface according to some embodiments.

FIG. 10 illustrates interface 800 after selection of the Team dimension object. The Team object has been removed from selection area 810 and added to Selected field 810. According to some embodiments, the addition of objects to selected field 810 generates a working title for the visualization that is being created. In the illustrated embodiment, selected objects are added to the selected field according to the following syntax: <Measure objects> "by" <Dimension objects>.

This selection of the Team dimension object also causes execution of S220 through S260 for each unselected object of in selection area 810, with respect to the Salary and Team objects. The font sizes of selection area 810 are then controlled based on the newly-calculated values.

Figure 11:
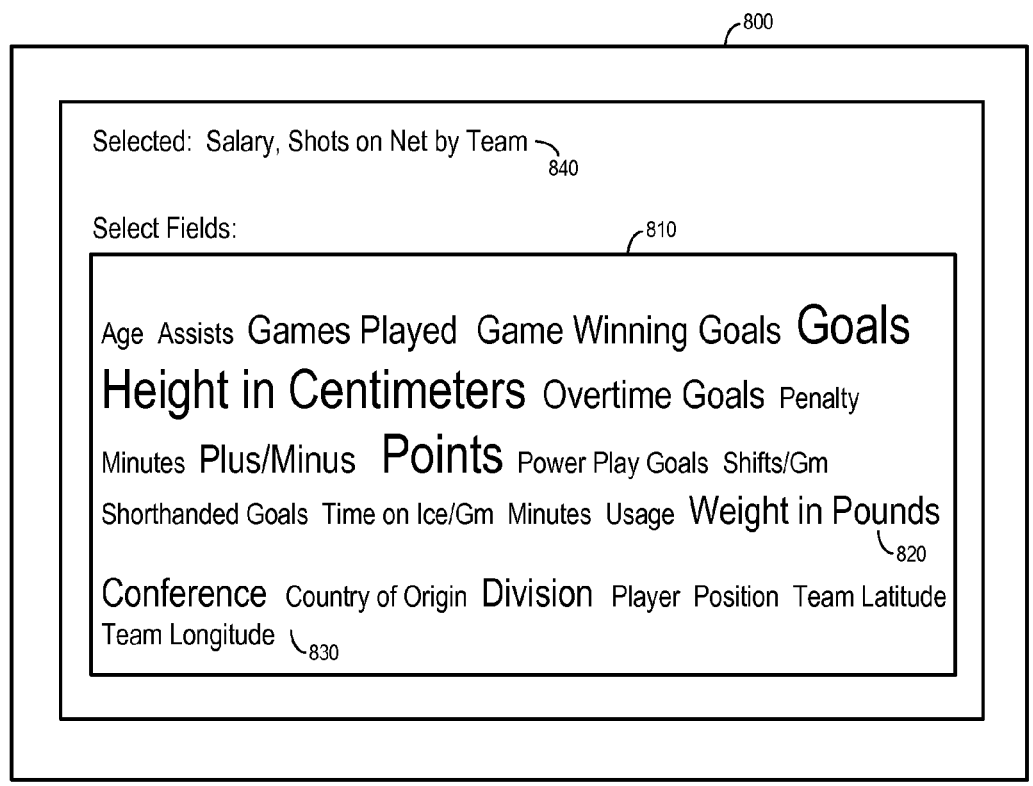
FIG. 11 is an outward view of a graphical interface according to some embodiments.

It is now assumed that the Shots on Net measure object is selected. FIG. 11 illustrates interface 800 after this selection, in which the Shots on Net object has been added to Selected field 810 according to the above syntax. This selection of the Team dimension object also causes execution of S220 through S260 for each unselected object of in selection area 810, with respect to the Salary, Team and Shots on Net objects. Again, the font sizes of selection area 810 are then controlled based on the newly-calculated values.

Figure 12:
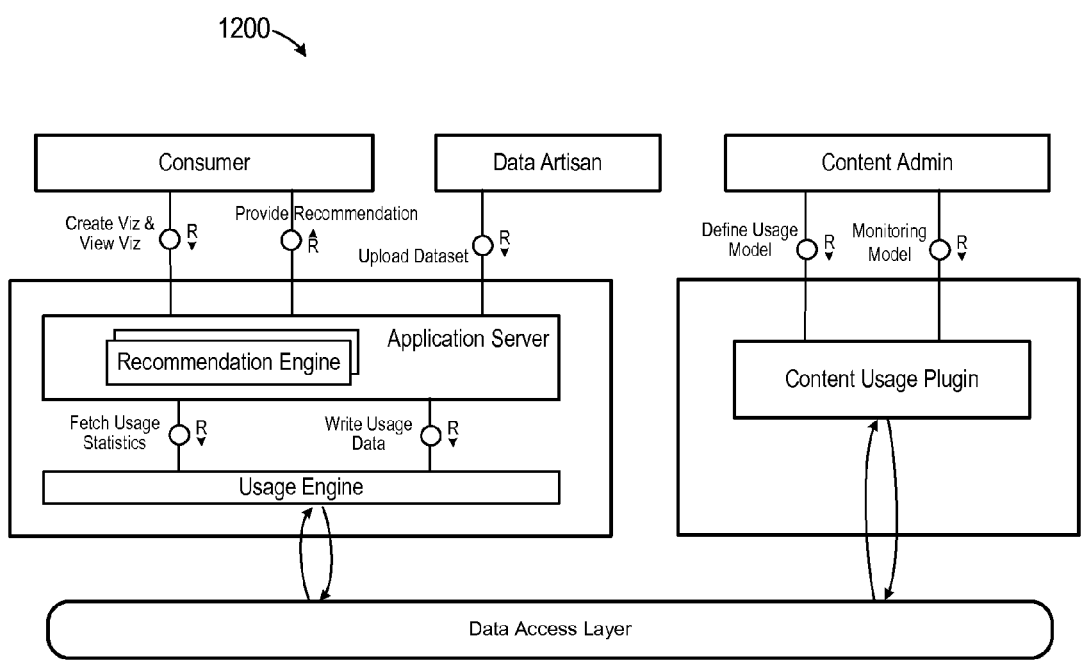
FIG. 12 is a block diagram of a system according to some embodiments.

FIG. 12 is a block diagram of a system according to some embodiments. System 1200 may be an implementation of system 100. Accordingly, the elements of system 1200 may perform any of the processes described herein.

System 1200 may operate to collect usage data relating to the user creation and usage of visualizations. Such usage data may be used to provide recommendations to users, including but not limited to indications of "relatedness" values as described herein.

The Usage Engine of system 1200 determines the usage data to be tracked, how to process the tracked data, how to store the processed data, and how to retrieve the stored data. The Usage Engine provides data to Recommendation Engine for calculation of values/recommendations.

For example, when a user creates a visualization, the Usage Engine tracks the user identity, the accessed Analytical View, the attributes and measures used in the visualization, and the manner in which the attributes and measures are used in the visualization view. The Usage Engine further processes this tracked data (e.g., adds timestamp and a unique id), defines relationships among the data, and stores the data and relationships to the Data Access Layer. In this regard, the Data Access Layer is a repository for the usage data.

The Recommendation Engine uses the usage data to determine recommendations, and provides the recommendations to the Consumer. The recommendations may consist of recommended objects to add to a visualization based on objects which have been already added to the visualization. A recommendation may consist of a value associated with one or more unselected objects which suggests the suitability of adding an object to the visualization.

The Recommendation Engine may offer one or more algorithms for determining recommendations. According to some embodiments, system 1200 exposes APIs to allow users to write recommendation algorithms for execution by the Recommendation Engine.

Figure 13:
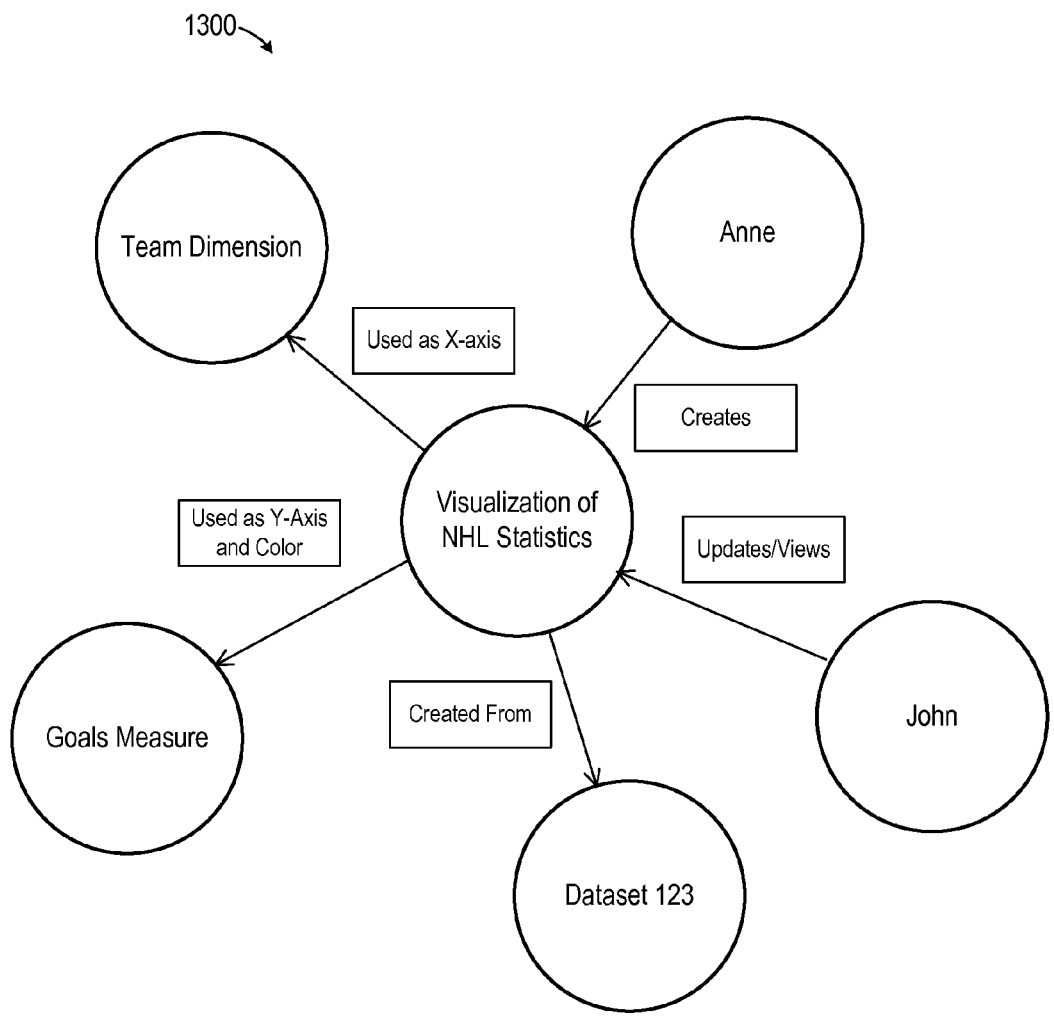
FIG. 13 is a diagram of a graph data structure according to some embodiments.

According to some embodiments, visualization usage occurs between a subject and an object. The usage itself is an action, for example 'View' or 'Query' or 'Update'. FIG. 13 includes diagram 1300 illustrating an example usage. In the example, User John updates Visualization of NHL Statistics by using the Team dimension object as X-axis and the Goals measure object as Y-axis and color.

According to some embodiments, a graph data structure is used to represent the usage data, where the subject and object are the vertices of a graph, the action is the edge of the graph, and the direction of an edge implies which vertex is the subject and which one is the object.

Using diagram 1300 as an example, the Visualization of NHL Statistics entity is an object for User John to Update, and also as a subject which uses the Goals measure as Y-axis, and so on. Therefore, the usage is represented by three vertices and two edges connected at the vertex Visualization of NHL Statistics. This represents one series of usage from a user to a visualization to a measure.

Depending on purpose, a recommendation engine may traverse the full path of the graph chain or just a portion of the graph around certain types of vertices. For example, the dimension and measure object recommendations may only need graph data from visualization to dimension/measures, while a visualization recommendation based on user profile may need the end-to-end graph to construct a best visualization with a certain configuration pattern of color and size.

Usage data may also consist of various types of persona, action, artifacts, etc. By representing the data in a graph data structure, these attributes may be implemented as properties of the graph vertices and edges. Timestamp and unique id may also be implemented as properties to allow a query to find all graph paths based on time, association and object types.

Figure 14:
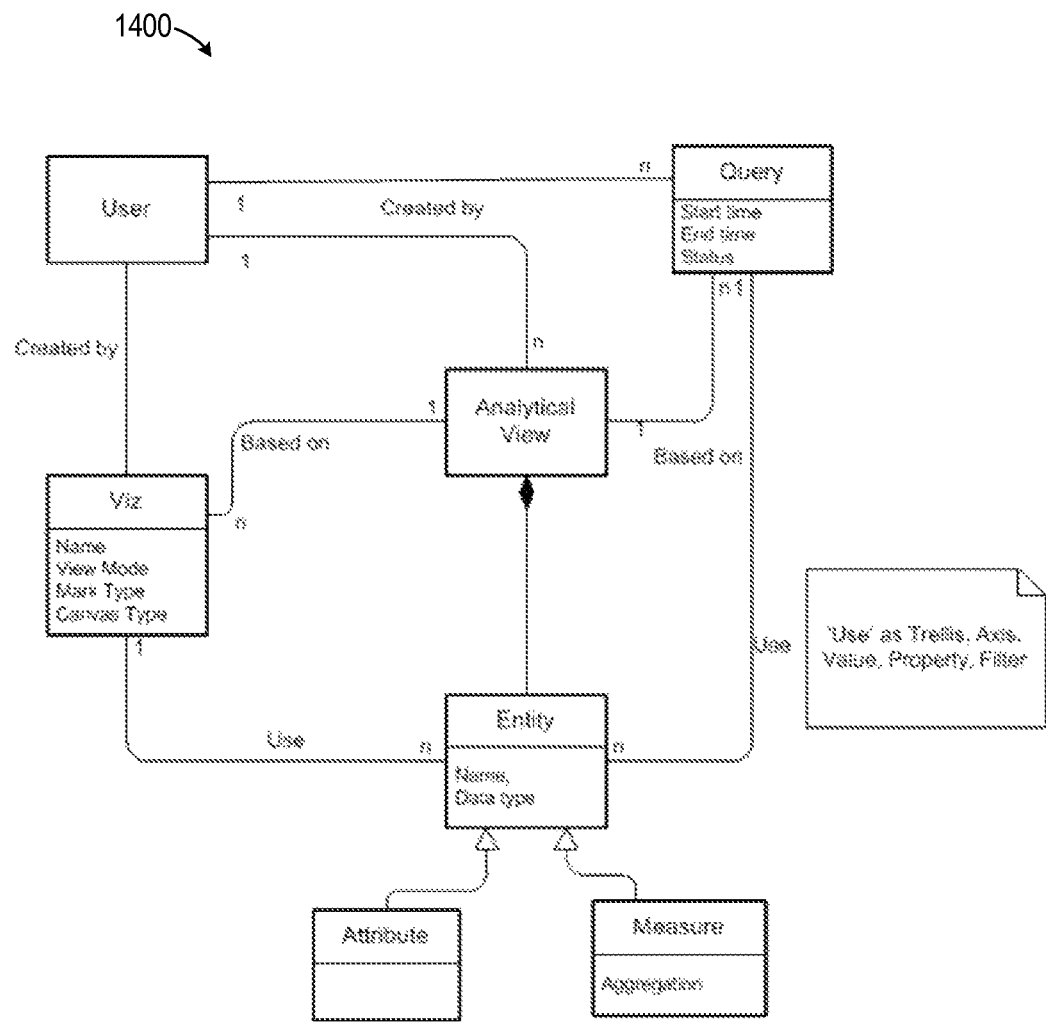
FIG. 14 is a Unified Modeling Language diagram according to some embodiments.

FIG. 14 is a Unified Modeling Language diagram of a usage data schema. Schema 1400 may be used by data source 110, by the data access layer of system 1200, or by any storage system to store usage data according to some embodiments.

Figure 15:
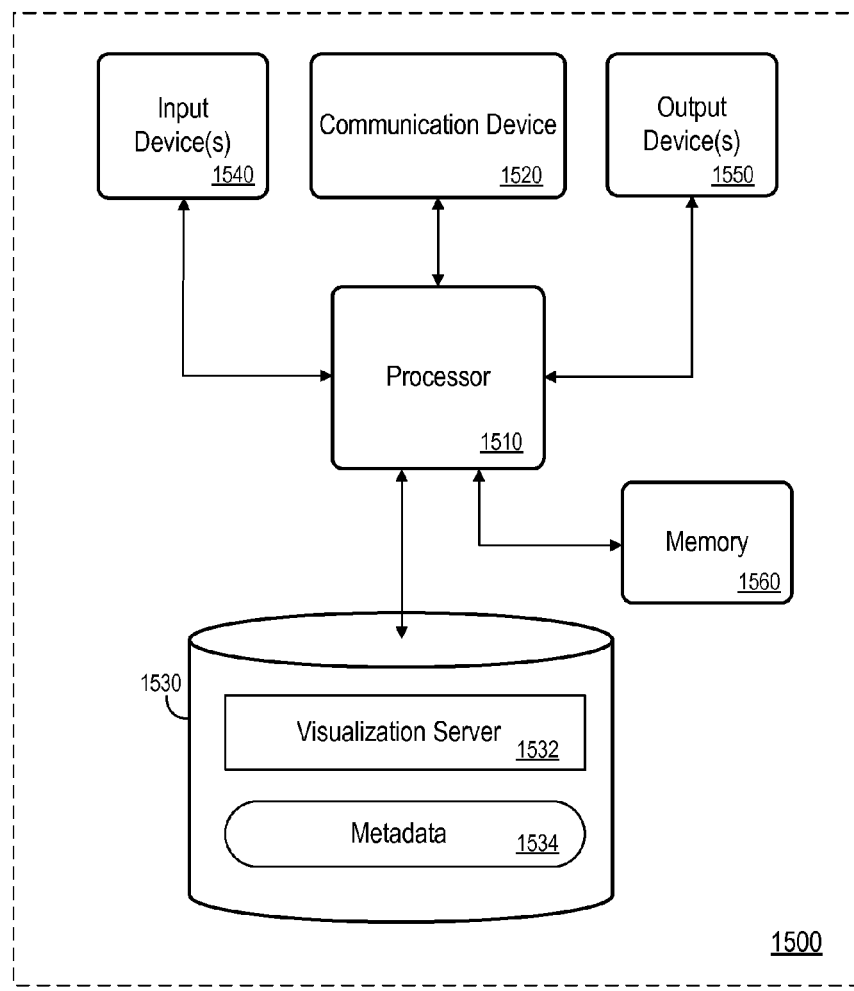
FIG. 15 is a block diagram of an apparatus according to some embodiments.

FIG. 15 is a block diagram of apparatus 1500 according to some embodiments. Apparatus 1500 may comprise a general-purpose computing apparatus and may execute program code to perform any of the functions described herein. Apparatus 1500 may comprise an implementation of visualization server 130 and data source 110 of FIG. 1 in some embodiments. Apparatus 1500 may include other unshown elements according to some embodiments.

Apparatus 1500 includes processor 1510 operatively coupled to communication device 1520, data storage device 1530, one or more input devices 1540, one or more output devices 1550 and memory 1560. Communication device 1520 may facilitate communication with external devices, such as a reporting client, or a data storage device. Input device(s) 1540 may comprise, for example, a keyboard, a keypad, a mouse or other pointing device, a microphone, knob or a switch, an infra-red (IR) port, a docking station, and/or a touch screen. Input device(s) 1540 may be used, for example, to enter information into apparatus 1500. Output device(s) 1550 may comprise, for example, a display (e.g., a display screen) a speaker, and/or a printer.

Data storage device 1530 may comprise any appropriate persistent storage device, including combinations of magnetic storage devices (e.g., magnetic tape, hard disk drives and flash memory), optical storage devices, Read Only Memory (ROM) devices, etc., while memory 1560 may comprise Random Access Memory (RAM).

Visualization server 1532 may comprise program code executed by processor 1510 to cause apparatus 1500 to perform any one or more of the processes described herein. Embodiments are not limited to execution of these processes by a single apparatus. Metadata 1534 may include information describing visualizations and associated objects as described above. Metadata 1534, as well as database data (either cached or a full database), may be stored in volatile memory such as memory 1560. Data storage device 1530 may also store data and other program code for providing additional functionality and/or which are necessary for operation of apparatus 1500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard drive, a floppy disk, a CD-ROM, a DVD-ROM, a Flash drive, magnetic tape, Flash memory and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable process steps; and
a processor to execute the processor-executable process steps to cause the system to:
receive a selection of a first object from a plurality of measure objects and dimension objects;
for each of a plurality of unselected objects of the plurality of measure objects and dimension objects, determine a first number of visualizations which are associated with the first object and with the unselected object;
determine a second number of visualizations which are associated with the first object;
for each of the plurality of unselected objects, determine a third number of visualizations which are associated with the unselected object;
determine a total number of visualizations; and
for each of the plurality of unselected objects, determine a value associated with the unselected object based on the first number associated with the unselected object, the second number, the third number associated with the unselected object and the total number.

2. A system according to claim 1, wherein the processor is further to execute the processor-executable process steps to cause the system to:
display text representing each of the plurality of measure objects and dimension objects; and
control an appearance of text representing each of the plurality of unselected objects based on the value.

3. A system according to claim 1, wherein the processor is further to execute the processor-executable process steps to cause the system to:
receive a selection of a second object from the plurality of measure objects and dimension objects;
for each of a second plurality of unselected objects of the plurality of measure objects and dimension objects, determine a fourth number of visualizations which are associated with the first object, the second object and the unselected object;
determine a fifth number of visualizations which are associated with the first object and the second object; and
for each of the second plurality of unselected objects, determine a second value associated with the unselected object based on the fourth number associated with the unselected object, the second number, the fifth number associated with the unselected object and the total number.

4. A system according to claim 1, wherein determination of the fourth number of visualizations comprises:
for one of the second plurality of unselected objects, determining that zero visualizations are associated with the first object, the second object and the unselected object, and
wherein, for the one of the second plurality of unselected objects, determination of the second value associated with the unselected object is based on the first number associated with the unselected object, the second number, the third number associated with the unselected object and the total number.

5. A system according to claim 4, wherein the processor is further to execute the processor-executable process steps to cause the system to:
determine that the second object is associated with fewer visualizations than the first object.

6. A system according to claim 1, wherein the processor is further to execute the processor-executable process steps to cause the system to:
display text representing each of the plurality of measure objects and dimension objects;
control an appearance of text representing each of the plurality of unselected objects based on the value; and
control an appearance of text representing each of the second plurality of unselected objects based on the second value.

7. A system according to claim 1, wherein the processor is further to execute the processor-executable process steps to cause the system to:
receive and store usage data indicating user creation and usage of visualizations.

8. A system according to claim 1, wherein the usage data is stored in a graph data structure, and wherein a subject and an object are vertices of the data structure, an action is and edge of the graph, and a direction of an edge indicates a subject vertex and which an object vertex.

9. A computer-implemented method comprising:
receiving a selection of a first object from a plurality of measure objects and dimension objects;
for each of a plurality of unselected objects of the plurality of measure objects and dimension objects, determining a first number of visualizations which are associated with the first object and with the unselected object;
determining a second number of visualizations which are associated with the first object;
for each of the plurality of unselected objects, determining a third number of visualizations which are associated with the unselected object;
determining a total number of visualizations;
for each of the plurality of unselected objects, determining a value associated with the unselected object based on the first number associated with the unselected object, the second number, the third number associated with the unselected object and the total number;
displaying text representing each of the plurality of measure objects and dimension objects; and
controlling an appearance of text representing each of the plurality of unselected objects based on the value.

10. A computer-implemented method according to claim 9, further comprising:
receiving a selection of a second object from the plurality of measure objects and dimension objects;
for each of a second plurality of unselected objects of the plurality of measure objects and dimension objects, determining a fourth number of visualizations which are associated with the first object, the second object and the unselected object;
determining a fifth number of visualizations which are associated with the first object and the second object; and
for each of the second plurality of unselected objects, determining a second value associated with the unselected object based on the fourth number associated with the unselected object, the second number, the fifth number associated with the unselected object and the total number.

11. A computer-implemented method according to claim 7, wherein determining the fourth number of visualizations comprises:
for one of the second plurality of unselected objects, determining that zero visualizations are associated with the first object, the second object and the unselected object, and wherein, for the one of the second plurality of unselected objects, determination of the second value associated with the unselected object is based on the first number associated with the unselected object, the second number, the third number associated with the unselected object and the total number.

12. A computer-implemented method according to claim 11, further comprising:
determining that the second object is associated with fewer visualizations than the first object.

13. A computer-implemented method according to claim 9, further comprising:
displaying text representing each of the plurality of measure objects and dimension objects;
controlling an appearance of text representing each of the plurality of unselected objects based on the value; and
controlling an appearance of text representing each of the second plurality of unselected objects based on the second value.

14. A computer-implemented method according to claim 9, further comprising:
receiving and store usage data indicating user creation and usage of visualizations,
wherein the usage data is stored in a graph data structure, and wherein a subject and an object are vertices of the data structure, an action is and edge of the graph, and a direction of an edge indicates a subject vertex and which an object vertex.

15. A non-transitory computer-readable medium storing program code, the program code executable by a computer system to cause to the computer system to:
receive a selection of a first object from a plurality of measure objects and dimension objects;
for each of a plurality of unselected objects of the plurality of measure objects and dimension objects, determine a first number of visualizations which are associated with the first object and with the unselected object;
determine a second number of visualizations which are associated with the first object;
for each of the plurality of unselected objects, determine a third number of visualizations which are associated with the unselected object;
determine a total number of visualizations; and
for each of the plurality of unselected objects, determine a value associated with the unselected object based on the first number associated with the unselected object, the second number, the third number associated with the unselected object and the total number.

16. A medium according to claim 15, wherein the program code is further executable by a computer system to cause to the computer system to:
display text representing each of the plurality of measure objects and dimension objects; and
control an appearance of text representing each of the plurality of unselected objects based on the value.

17. A medium according to claim 15, wherein the program code is further executable by a computer system to cause to the computer system to:
receive a selection of a second object from the plurality of measure objects and dimension objects;
for each of a second plurality of unselected objects of the plurality of measure objects and dimension objects, determine a fourth number of visualizations which are associated with the first object, the second object and the unselected object;
determine a fifth number of visualizations which are associated with the first object and the second object; and
for each of the second plurality of unselected objects, determine a second value associated with the unselected object based on the fourth number associated with the unselected object, the second number, the fifth number associated with the unselected object and the total number.

18. A medium according to claim 15, wherein determination of the fourth number of visualizations comprises:
for one of the second plurality of unselected objects, determining that zero visualizations are associated with the first object, the second object and the unselected object, and
wherein, for the one of the second plurality of unselected objects, determination of the second value associated with the unselected object is based on the first number associated with the unselected object, the second number, the third number associated with the unselected object and the total number.

19. A medium according to claim 18, wherein the program code is further executable by a computer system to cause to the computer system to:
determine that the second object is associated with fewer visualizations than the first object.

20. A medium according to claim 15, wherein the program code is further executable by a computer system to cause to the computer system to:
display text representing each of the plurality of measure objects and dimension objects;
control an appearance of text representing each of the plurality of unselected objects based on the value; and
control an appearance of text representing each of the second plurality of unselected objects based on the second value.

* * * * *